R. F. KREITER.
INSECT GUARD.
APPLICATION FILED AUG. 31, 1915.

1,221,999.

Patented Apr. 10, 1917.

WITNESSES:

INVENTOR
Richard F. Kreiter
BY
Hardway & Lathey
ATTORNEYS

UNITED STATES PATENT OFFICE.

RICHARD F. KREITER, OF HOUSTON, TEXAS.

INSECT-GUARD.

1,221,999.  Specification of Letters Patent.  Patented Apr. 10, 1917.

Application filed August 31, 1915. Serial No. 48,319.

*To all whom it may concern:*

Be it known that I, RICHARD F. KREITER, a citizen of the United States, residing at Houston, in the county of Harris and State of Texas, have invented certain new and useful Improvements in Insect-Guards, of which the following is a specification.

This invention relates to new and useful improvements in an insect guard.

The object of the invention is to provide a device of the character described adapted to be attached to the supporting legs of a table or other article to be protected and which prevents such insects as ants and the like from passing up said legs. The device may be attached to any article of furniture desired as refrigerators and other kitchen furniture and may also be attached at any point of contact with the floor or wall.

With the above and other objects in view the invention has particular relation to certain novel features of construction, arrangement of parts and use an example of which is given in this specification and illustrated in the accompanying drawings wherein:—

Figure 1:
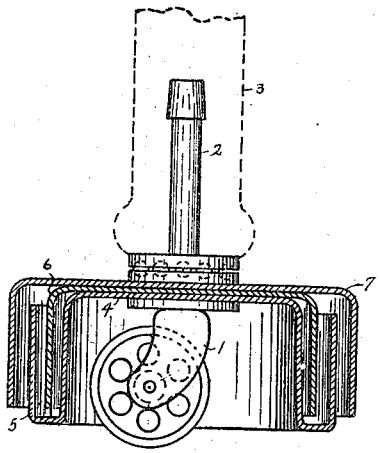
Figure 1 is a sectional side elevation of one form of the device.

Referring now more particularly to the form shown in Fig. 1 the numeral 1 designates a caster of any well known form having the shank 2 which projects up into the corresponding socket in the leg 3. Secured to the shank 2 is an inverted cup 4 which surrounds the caster 1 and is spaced therefrom but which clears the floor. The rim of this cup is extended and upturned forming the external annular chamber 5. The numeral 6 refers to an inverted cup which is secured to the shank 2 and whose rim projects down into the chamber 5 but clears the bottom thereof and which is spaced a uniform distance between the walls of said chamber. In order to reach the table leg from the floor an ant must travel up the caster 1 and then follow around the inner wall of the cup 4 and along the outer side of the upturned rim thereof and then along the inner walls of the chamber 5 onto the inner side of the cup 6 and down to the margin of the rim thereof. When this margin is reached, it has been found by actual experiment that the ant will pass on down to the bottom of the chamber 5 and thus in effect be trapped within the device and will virtually travel around in a circle and never reach the leg 3.

The chamber 5 is protected from becoming filled with foreign matter by means of the inverted cup 7 which is secured to the shank 2 and surrounds and incloses the entire device but is spaced therefrom and whose rim clears the floor a suitable distance.

Figure 2:
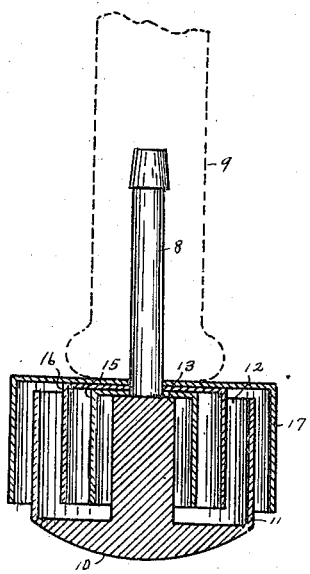
Fig. 2 is a sectional side elevation of another form thereof.

In Fig. 2 the shank is indicated by the numeral 8 and the leg to which it is secured by the numeral 9. The shank 8 is integral at its lower end with the sliding caster 10 whose lower face is convex and which is disk-like in form. From the margin of the caster 10 upstands the rim 11 forming a cup which incloses the chamber 12. On a line with the upper edge with this rim the shank is suddenly off-set forming the annular shoulder 13 which supports two inverted cups 15 and 16 whose rims project down into the chamber 12 and are spaced from each other and from the shank and rim 11 and whose edges clear the bottom of the chamber 12. Only one of these inverted cups would probably be sufficient, as shown in Fig. 1 but two have been provided as an additional precaution.

Chamber 12 is protected from foreign matter which might fall therein by means of the cup 17 which is inverted thereover and secured to the shank 8 and which is spaced from the device on all sides and clears the floor the required distance. The form shown in Fig. 2 will operate in a similar manner to that shown in Fig. 1 to ward off insects from the table or other article to which it is attached.

What I claim is:—

The combination with a supporting leg, of a horizontal plate, two annular flanges spaced apart and depending therefrom, one within the other, a cup shaped member attached to said leg and whose rim projects up between said flanges and the free edge of which is spaced from the plate, the free edge of the inner flange extending nearly to the bottom of the cup shaped member.

In testimony whereof I have signed my name to this specification in the presence of two subscribing witnesses.

RICHARD F. KREITER.

Witnesses:
J. A. WATSON,
A. C. SPRINGFIELD.

Copies of this patent may be obtained for five cents each, by addressing the "Commissioner of Patents, Washington, D. C."